(12) United States Patent
Yuan

(10) Patent No.: US 11,962,917 B2
(45) Date of Patent: Apr. 16, 2024

(54) COLOR ADJUSTMENT METHOD, COLOR ADJUSTMENT DEVICE, ELECTRONIC DEVICE AND COMPUTER-READABLE STORAGE MEDIUM

(71) Applicant: ZHEJIANG UNIVIEW TECHNOLOGIES CO., LTD., Binjiang District Hangzhou (CN)

(72) Inventor: Yuguang Yuan, Binjiang District Hangzhou (CN)

(73) Assignee: Zhejiang Uniview Technologies Co., Ltd., Zhejiang (CN)

( * ) Notice: Subject to any disclaimer, the term of this patent is extended or adjusted under 35 U.S.C. 154(b) by 455 days.

(21) Appl. No.: 17/291,905

(22) PCT Filed: Apr. 4, 2019

(86) PCT No.: PCT/CN2019/081507
§ 371 (c)(1),
(2) Date: May 6, 2021

(87) PCT Pub. No.: WO2020/093653
PCT Pub. Date: May 14, 2020

(65) Prior Publication Data
US 2022/0006982 A1    Jan. 6, 2022

(30) Foreign Application Priority Data

Nov. 7, 2018    (CN) .......................... 201811321951.3

(51) Int. Cl.
*G06T 3/4015*    (2024.01)
*G06T 5/70*    (2024.01)
(Continued)

(52) U.S. Cl.
CPC ............. *H04N 23/843* (2023.01); *G06T 5/70* (2024.01); *H04N 9/77* (2013.01); *H04N 25/702* (2023.01);
(Continued)

(58) Field of Classification Search
CPC ...... H04N 23/843; H04N 9/77; H04N 25/702; H04N 9/646; H04N 23/10;
(Continued)

(56) References Cited

U.S. PATENT DOCUMENTS

| 7,822,293 | B2 | 10/2010 | Jerdev |
| 8,238,685 | B2 * | 8/2012 | Chiang ..................... G06T 5/20 382/265 |

(Continued)

FOREIGN PATENT DOCUMENTS

| CN | 101336438 A | 12/2008 |
| CN | 101388948 A | 3/2009 |

(Continued)

OTHER PUBLICATIONS

International Search Report dated Jul. 29, 2019 in International Patent Application No. PCT/CN2019/081507, pp. 1-4.

(Continued)

*Primary Examiner* — Jose L Couso
(74) *Attorney, Agent, or Firm* — Byrne Poh LLP

(57) ABSTRACT

Provided are a color adjustment method, a color adjustment device, an electronic device, and a computer-readable storage medium. The method includes: determining an adjustment area corresponding to an edge pixel, where the adjustment area includes multiple pixels; acquiring color information of the edge pixel and color information of each similar pixel in the adjustment area, where a pixel type of the similar pixel is consistent with a pixel type of the edge pixel; and adjusting a parameter value of the edge pixel according
(Continued)

to the color information of the each similar pixel, the color information of the edge pixel, and a brightness parameter of the edge pixel.

20 Claims, 3 Drawing Sheets

(51) Int. Cl.
*H04N 9/77* (2006.01)
*H04N 23/84* (2023.01)
*H04N 25/702* (2023.01)

(52) U.S. Cl.
CPC ........... *G06T 2207/10024* (2013.01); *G06T 2207/20192* (2013.01)

(58) Field of Classification Search
CPC ........... H04N 2209/046; H04N 25/134; H04N 25/611; H04N 1/407; H04N 1/6027; H04N 23/88; G06T 5/002; G06T 2207/10024; G06T 2207/20192; G06T 3/4015; G06T 3/40; G06T 3/4007; G06T 3/403; G06T 5/007; G06T 5/008; G06T 2207/20182
See application file for complete search history.

(56) References Cited

U.S. PATENT DOCUMENTS

| | | | | |
|---|---|---|---|---|
| 9,131,196 | B2* | 9/2015 | Lim | ........................ H04N 23/80 |
| 2005/0093992 | A1* | 5/2005 | Fukumoto | ............... G06T 5/003 |
| | | | | 348/222.1 |
| 2005/0117036 | A1* | 6/2005 | Nishi | .................. H04N 19/186 |
| | | | | 348/E5.079 |
| 2007/0269104 | A1* | 11/2007 | Whitehead | ............. G06T 5/008 |
| | | | | 382/162 |
| 2008/0088858 | A1 | 4/2008 | Marcu et al. | |
| 2008/0291312 | A1 | 11/2008 | Egawa | |
| 2011/0090242 | A1* | 4/2011 | Cote | ..................... G06T 3/4015 |
| | | | | 345/597 |
| 2012/0050563 | A1* | 3/2012 | Cote | ..................... H04N 23/70 |
| | | | | 348/223.1 |
| 2013/0051665 | A1* | 2/2013 | Shinozaki | ............... G06T 5/005 |
| | | | | 382/167 |
| 2013/0272605 | A1 | 10/2013 | Saito et al. | |
| 2014/0211060 | A1 | 7/2014 | Funao | |
| 2014/0307129 | A1* | 10/2014 | Feng | ..................... H04N 23/88 |
| | | | | 348/242 |

FOREIGN PATENT DOCUMENTS

| | | |
|---|---|---|
| CN | 101867830 A | 10/2010 |
| CN | 101895692 A | 11/2010 |
| CN | 102426828 A | 4/2012 |
| CN | 102640499 A | 8/2012 |
| CN | 105578160 A | 5/2016 |
| CN | 106303483 A | 1/2017 |
| CN | 106454303 A | 2/2017 |
| CN | 106878634 A | 6/2017 |
| JP | 2009192565 A | 8/2009 |

OTHER PUBLICATIONS

Office Action dated Sep. 21, 2020 in CN Patent Application No. 201811321951.3, pp. 1-9.
Extended European Search Report dated Jul. 8, 2022 in EP Patent Application No. 1988219.0, pp. 1-7.
First Search Report in CN Patent Application No. 201811321951.3, Date: Unknown, pp. 1.
Supplementary Search Report in CN Patent Application No. 201811321951.3, Date: Unknown, pp. 1.

\* cited by examiner

COLOR ADJUSTMENT METHOD, COLOR ADJUSTMENT DEVICE, ELECTRONIC DEVICE AND COMPUTER-READABLE STORAGE MEDIUM

CROSS-REFERENCE TO RELATED APPLICATIONS

The present disclosure is a U.S. National Stage Application of PCT Application Serial No. PCT/CN2019/081507, filed Apr. 4, 2019, which claims priority to Chinese Patent Application No. 201811321951.3 filed with the CNIPA on Nov. 7, 2018, the disclosures of which are incorporated herein by reference in their entireties.

TECHNICAL FIELD

The present disclosure relates to the technical field of image processing, for example, a color adjustment method, a color adjustment device, an electronic device, and a computer-readable storage medium.

BACKGROUND

The image in the Bayer format is the original image shot by the camera. Each pixel in the Bayer image is one color component of the three primary colors, namely, red, green, and blue (RGB). Each pixel in the Bayer image needs to be converted to obtain the image in the RGB format for daily use.

In the process of converting the Bayer image, the parameter values of other color components of the three primary colors may be obtained by the manner of linear neighborhood interpolation according to the parameter value of each pixel adjacent to the pixel, the parameter values of the other color components are inserted into the parameter value of the pixel, the image of which each pixel represented in the RGB format is obtained, and then the conversion of the Bayer image is completed.

However, due to factors such as the interpolation algorithm and spatial undersampling, in the case where a pixel in the Bayer image is an edge pixel at the edge of the scene, the color component value of this edge pixel obtained by interpolation may be inconsistent with the color of the actual object. In this manner, after the Bayer image is converted, the conversion deviation may be caused, leading to the occurrence of false color.

SUMMARY

The present disclosure provides a color adjustment method, a color adjustment device, an electronic device, and a computer-readable storage medium, which is conducive to solving the following problem: after the Bayer image is converted, the conversion deviation may be caused, leading to the occurrence of false color.

The present disclosure provides a color adjustment method. The method includes the steps described below.

An adjustment area corresponding to an edge pixel is determined, where the adjustment area includes multiple pixels.

Color information of the edge pixel and Color information of each similar pixel in the adjustment area are acquired, where a pixel type of the each similar pixel is consistent with a pixel type of the edge pixel.

A parameter value of the edge pixel is adjusted according to the color information of the each similar pixel, the color information of the edge pixel, and a brightness parameter of the edge pixel.

Embodiments of the present disclosure further provide a color adjustment device. The device includes a first determination module, a first acquisition module, and an adjustment module.

The first determination module is configured to determine an adjustment area corresponding to an edge pixel, where the adjustment area includes multiple pixels.

The first acquisition module is configured to acquire color information of the edge pixel and color information of each similar pixel in the adjustment area, where a pixel type of the each similar pixel is consistent with a pixel type of the edge pixel.

The adjustment module is configured to adjust a parameter value of the edge pixel according to the color information of the each similar pixel, the color information of the edge pixel, and a brightness parameter of the edge pixel.

Embodiments of the present disclosure further provide an electronic device. The electronic device includes: at least one processor; and a memory, which is configured to store at least one program.

When executed by the at least one processor, the at least one program enables the at least one processor to perform the preceding method.

Embodiments of the present disclosure further provide a computer-readable storage medium that stores computer instructions that, when executed by a processor, perform the steps of the preceding color adjustment method.

DETAILED DESCRIPTION

Figure 1:
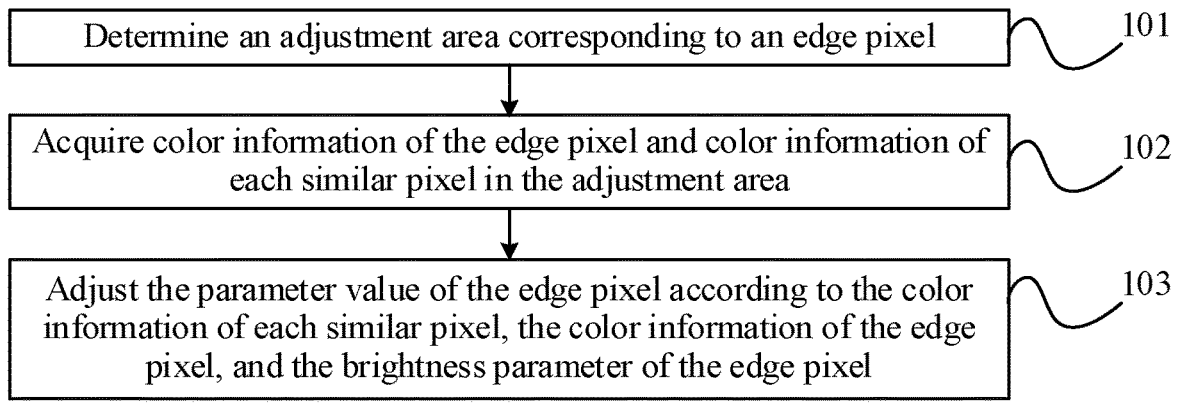
FIG. 1 is a flowchart of a color adjustment method according to an embodiment of the present disclosure.

The present disclosure provides a color adjustment method. The method includes the steps described below.

An adjustment area corresponding to an edge pixel is determined, where the adjustment area includes multiple pixels.

Color information of the edge pixel and color information of each similar pixel in the adjustment area are acquired, where a pixel type of the each similar pixel is consistent with a pixel type of the edge pixel.

A parameter value of the edge pixel is adjusted according to the color information of the each similar pixel, the color information of the edge pixel, and a brightness parameter of the edge pixel.

In an embodiment, the step in which the color information of the each similar pixel in the adjustment area is acquired includes the steps described below.

Multiple similar pixels are selected according to the pixel type of each pixel in the adjustment area.

Whether a parameter value of each similar pixel is greater than a saturation parameter value is determined.

Based on a determination result that the parameter value of the similar pixel is not greater than the saturation parameter value, calculation is performed according to the parameter value of the similar pixel, a brightness parameter of the similar pixel, and a black level parameter of an image to which the similar pixel belongs so that the color information of the similar pixel is obtained.

In an embodiment, after whether the parameter value of each similar pixel is greater than the saturation parameter value is determined, the method further includes the steps described below.

Based on the determination result that the parameter value of the similar pixel is greater than the saturation parameter value, the color information of the similar pixel is acquired according to a preset color ratio relationship.

In an embodiment, before the adjustment area corresponding to the edge pixel is determined, the method further includes the steps described below.

A parameter value of at least one adjacent reference pixel for a non-reference pixel is acquired, where each adjacent reference pixel is adjacent to the non-reference pixel.

A pixel identifier is added to the non-reference pixel according to a parameter value of each adjacent reference pixel, where the pixel identifier is configured to indicate whether the non-reference pixel is the edge pixel.

In an embodiment, the step in which the pixel identifier is added to the non-reference pixel according to the parameter value of each adjacent reference pixel includes the steps described below.

According to the parameter value of each adjacent reference pixel, a maximum parameter value and a minimum parameter value are selected.

Whether a quotient between a difference between the maximum parameter value and the minimum parameter value and the minimum parameter value is greater than a segment parameter value to which the minimum parameter value belongs is determined and a determination result is obtained.

According to the determination result, the pixel identifier is added to the non-reference pixel.

In an embodiment, the pixel identifier includes an edge identifier and a non-edge identifier.

The step in which according to the determination result, the pixel identifier is added to the non-reference pixel includes the steps described below.

The edge identifier is added to the non-reference pixel based on the determination result that the quotient is greater than the segment parameter value to which the minimum parameter value belongs.

The non-edge identifier is added to the non-reference pixel based on the determination result indicating that the quotient is not greater than the segment parameter value to which the minimum parameter value belongs.

In an embodiment, the step in which the adjustment area corresponding to the edge pixel is determined includes the steps described below.

According to the pixel identifier of each pixel in the image, the edge pixel is selected from pixels.

According to a position of each edge pixel in the image, the adjustment area is selected.

In an embodiment, before the adjustment area corresponding to the edge pixel is determined, the method further includes the steps described below.

A white balance parameter of the image is acquired.

Calculation is performed according to the white balance parameter and the black level parameter of the image so that the saturation parameter value is obtained.

In an embodiment, before the adjustment area corresponding to the edge pixel is determined, the method further includes the steps described below.

The pixel type of the each pixel is acquired.

A parameter value of at least one adjacent reference pixel is acquired, where each adjacent reference pixel is adjacent to one non-reference pixel.

A brightness parameter of the non-reference pixel is calculated according to a parameter value of each reference pixel.

In an embodiment, before the adjustment area corresponding to the edge pixel is determined, the method further includes the steps described below.

A parameter value of one reference pixel serves as a brightness parameter of the reference pixel.

FIG. 1 is a flowchart of a color adjustment method according to an embodiment of the present disclosure. As shown in FIG. 1, the method includes the steps described below.

In step 101, an adjustment area corresponding to an edge pixel is determined.

The adjustment area may include multiple pixels. For example, the adjustment area may be an M*M matrix with the edge pixel as a center, and M may be a positive integer greater than or equal to 5.

An image displayed in the Bayer format may include multiple pixels, and each pixel displays only one of the three primary colors of RGB so that a Bayer image in which the pixels of different colors are arranged in a regular manner.

In the process of converting a Bayer image to an RGB image, each pixel in the Bayer image needs to be interpolated so that each pixel has the parameter value of each of the three primary colors of RGB, and thus the RGB image is obtained through conversion.

In the shooting process, the parameter values of the pixels corresponding to the edges of different scenes in the Bayer image may be interpolated inaccurately, that is, the color component values of the pixels at the edges of the scenes in the Bayer image obtained by interpolation may be inconsistent with the color of the object. Therefore, such pixels may serve as edge pixels, and the adjustment area of the edge pixels may be determined so that in the subsequent steps, the parameter values of the edge pixels may be adjusted according to other pixels in the area, and thus the adjusted parameter values are more approximate to the real parameter values.

The upper limits of the parameter values of the pixels corresponding to different colors in the Bayer image may be determined according to the ratio of the number of pixels of the three colors, which is not limited in embodiments of the present disclosure. For example, the ratio of the numbers of three pixels of red, green, and blue pixels in the Bayer image may be 1:2:1.

It is to be noted that in practical applications, one image may include multiple edge pixels, and the terminal may determine the adjustment area corresponding to each edge pixel according to the position of each edge pixel in the image. In embodiments of the present disclosure, for ease of description, only one edge pixel and the corresponding adjustment area are used as an example for description. Embodiments of the present disclosure do not limit the number of edge pixels and the number of corresponding adjustment areas.

Moreover, in an environment irradiated by natural light, the case where the parameter value of the pixel that displays the green color reaches the upper limit of the parameter value has little effect on the RGB image obtained through conversion. Therefore, the edge pixels may include pixels the display the red color and pixels that display the blue color.

In step 102, color information of the edge pixel and color information of each similar pixel in the adjustment area are acquired.

A pixel type of the similar pixel is consistent with a pixel type of the edge pixel.

Since each pixel in the Bayer image only displays one color, each pixel may be distinguished according to the color displayed by each pixel so that pixels that display the same color serve as pixels of the same type.

After the terminal determines the adjustment area corresponding to the edge pixel, the terminal may select, from the adjustment area, a similar pixel whose pixel type is consistent with the pixel type of the edge pixel, and calculate the color information of each similar pixel, so that in the subsequent steps, the parameter value of the edge pixel can be adjusted according to the color information of each similar pixel.

In an embodiment, the terminal may first select a pixel whose color is consistent with the color of the edge pixel as the similar pixel according to the color displayed by each pixel in the adjustment area so that multiple similar pixels can be obtained in the adjustment area. Moreover, calculation is performed according to the parameter value of each similar pixel, the brightness parameter of each similar pixel and the black level parameter of the image to which the adjustment area belongs, and thus the color information of each similar pixel is obtained.

The brightness parameter of each similar pixel may be obtained according to the parameter values of other adjacent pixels, and of course, may also be obtained in other manners, which is not limited in embodiments of the present disclosure.

Similarly, the color information of the edge pixel may be obtained according to the preceding manner, which will not be repeated herein.

In step 103, the parameter value of the edge pixel is adjusted according to the color information of each similar pixel, the color information of the edge pixel, and a brightness parameter of the edge pixel.

The terminal may perform calculation according to the preset parameter adjustment formula based on the color information of each similar pixel and the color information of the edge pixel in conjunction with the brightness parameter of the edge pixel so that the adjusted parameter value of the edge pixel is obtained, and then the parameter value of the edge pixel is adjusted according to the parameter value obtained through calculation.

The preset parameter adjustment formula may be described below.

$$A = B * \frac{C_0 * 4 + (C_1 + C_2 + C_3 + C_4) * 2 + C_5 + C_6 + C_7 + C_8}{N}$$

A is the adjusted parameter value, B is the brightness parameter of the edge pixel, $C_0$ is the color information of the edge pixel, $C_1$, $C_2 C_3$, and $C_4$ are the color information of similar pixels in the same column or row as the edge pixel, $C_5$, $C_6$, $C_7$, and $C_8$ are the color information of the remaining similar pixels in the adjustment area, N is a positive integer and may be determined according to the number of color information in the preset parameter adjustment formula. For example, if the preceding formula includes a total of 16 pieces of color information, N may be set to 16.

In other embodiments, before the adjusted parameter A is calculated, methods such as closest approximation may also be used. Several (for example, two) similar pixels that are most similar to the edge pixel are selected among all the similar pixels, and the product of the average value of the color information of the several selected similar pixels and the brightness parameter B of the edge pixel is used as the adjusted parameter value A.

During the specific implementation, after the parameter value of the edge pixel in the Bayer image is adjusted, each pixel in the Bayer image may be converted so that an image in the RGB format for daily use is obtained.

To sum up, in the color adjustment method provided in embodiments of the present disclosure, the adjustment area corresponding to the edge pixel is determined, the color information of each similar pixel in the adjustment area and the color information of the edge pixel are acquired, and the parameter value of the edge pixel is adjusted according to the color information of each similar pixel, the color information of the edge pixel, and the brightness parameter of the edge pixel. The parameter value of the edge pixel is adjusted so that the adjusted parameter value is approximate to the true parameter value corresponding to the edge pixel, the occurrence of false color pixels in an RGB image after the Bayer image is converted to the RGB image is avoided, and the accuracy of the case where the Bayer image is converted to the RGB image is improved.

Figure 2:
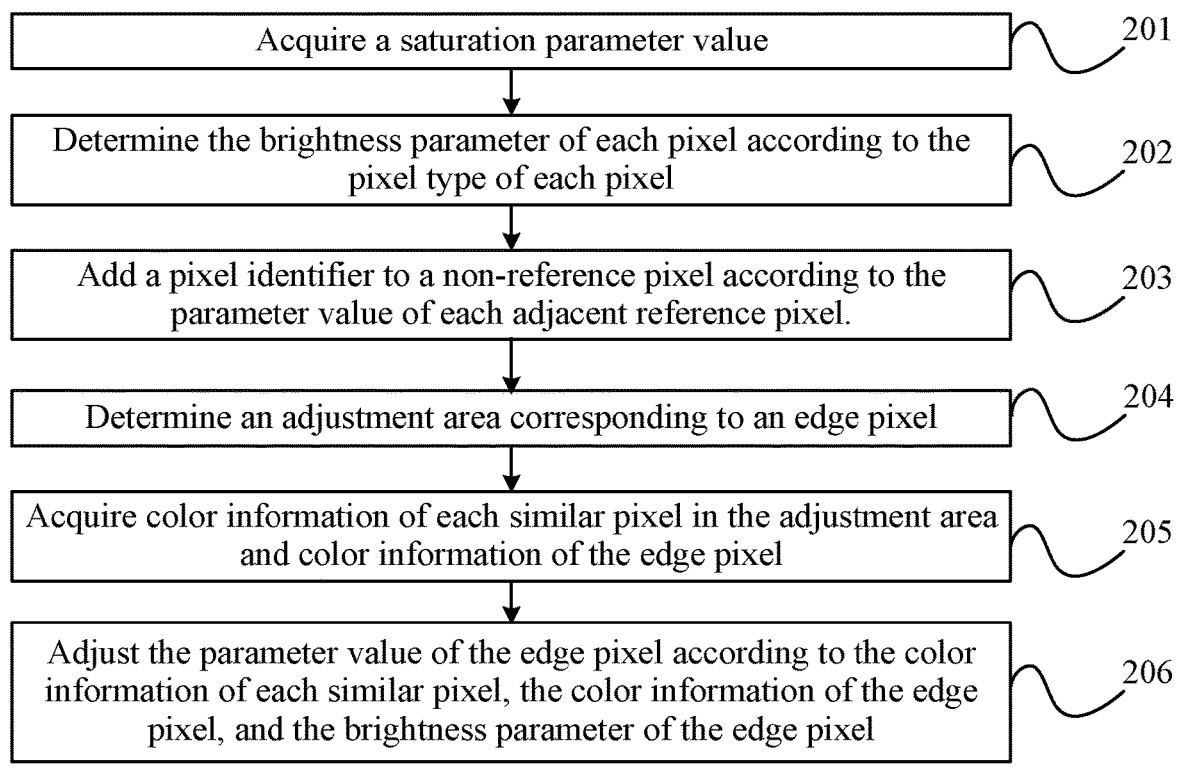
FIG. 2 is a flowchart of a color adjustment method according to another embodiment of the present disclosure.

FIG. 2 is a flowchart of a color adjustment method according to another embodiment of the present disclosure. As shown in FIG. 2, the method includes the steps described below.

In step 201, a saturation parameter value is acquired.

The saturation parameter value is configured to indicate whether each pixel in the image is in a saturated state. If the parameter value of a certain pixel is greater than the corresponding saturation parameter value, it is indicated that the certain pixel is in the saturated state.

When the terminal adjusts the parameter value of each pixel in the Bayer image, the saturation parameter value of each pixel in the image may be determined first so that in the subsequent steps, the color information of each edge pixel can be determined according to the determined saturation parameter value.

Optionally, the white balance parameter of the image may be obtained, and calculation is performed according to the white balance parameter and the black level parameter of the image so that the saturation parameter value is obtained. Specifically, the terminal may first obtain the white balance parameter of the image and perform calculation according to the preset calculation formula of the saturation parameter value based on the acquired white balance parameter and the black level parameter of the image so that the saturation parameter values of pixels that display the red color and pixels that display the blue color in the Bayer image are obtained.

The calculation formula of the saturation parameter value may be described below.

$$R = (G_{max} - W) * \frac{G_{gain}}{R_{gain}}$$

R is the saturation parameter value, $G_{max}$ is the maximum parameter value that may be achieved by a pixel that displays the green color in the image, W is the pre-acquired black level parameter of the image, $G_{gain}$ and $R_{gain}$ are the white balance parameters of the image, $G_{gain}$ is the white balance parameter corresponding to the pixel that displays the green color in the image, and $R_{gain}$ is the white balance parameter corresponding to the pixel that displays the red color or the pixel that displays the blue color in the image.

During the specific implementation, when the saturation parameter value R of the pixel of red color is calculated, $R_{gain}$ is the white balance parameter corresponding to the pixel of red color; when the saturation parameter value R of the pixel of blue color is calculated, $R_{gain}$ is the white balance parameter corresponding to the pixel of blue color.

In step 202, a brightness parameter of each pixel is determined according to the pixel type of each pixel.

Since each pixel in the Bayer image only displays any one of the three primary colors of RGB, pixels that display the same color may serve as pixels of the same type according to the color displayed by each pixel.

Moreover, in an environment irradiated by natural light, in the case where the pixels that display the green color are saturated, the possibility of the occurrence of false colors after the image is converted to the RGB image is relatively less. Therefore, the pixels that display the green color may serve as the reference pixels, and the pixels that display the red color and the pixels that display the blue color may serve as the non-reference pixels.

Correspondingly, in the subsequent steps, the terminal may adjust the parameter value of the non-reference pixel instead of adjusting the parameter value of the reference pixel.

Moreover, since the brightness of the pixel may be expressed in different manners in different color spaces, in the RGB color space, the parameter value corresponding to green may be used to express the brightness of the pixel. Therefore, when the terminal acquires the brightness parameter of each pixel in the Bayer image, the brightness parameters of the pixels may be determined according to the pixels of different types.

Optionally, the terminal may acquire the pixel type of each pixel. If the pixel is a reference pixel, the parameter value of the reference pixel may serve as the brightness parameter. However, if the pixel is a non-reference pixel, the parameter value of at least one adjacent reference pixel is acquired, and calculation is performed according to the parameter value of each reference pixel so that the brightness parameter of the non-reference pixel is obtained.

Each adjacent reference pixel is adjacent to the non-reference pixel.

In an embodiment, the terminal may acquire the pixel type of each pixel in the image so that whether the selected pixel is a reference pixel or a non-reference pixel is determined. If the selected pixel is a reference pixel, the parameter value of the reference pixel may serve as the brightness parameter. However, if the selected pixel is a non-reference pixel, calculation needs to be performed according to the parameter value of the reference pixel adjacent to the non-reference pixel so that the brightness parameter corresponding to the non-reference pixel is obtained. In this manner, in the subsequent steps, the terminal may adjust the parameter value of the edge pixel according to the brightness parameter of the edge pixel.

For example, if a certain non-reference pixel has four adjacent reference pixels, the terminal may calculate the average value of the parameter values of the four adjacent reference pixels so that the obtained average value may serve as the brightness parameter of the non-reference pixel.

Of course, the terminal may also calculate the brightness parameter of the non-reference pixel by using other manners, which is not limited in embodiments of the present disclosure.

In step 203, a pixel identifier is added to the non-reference pixel according to the parameter value of each adjacent reference pixel.

The pixel identifier is configured to indicate whether the non-reference pixel is an edge pixel, and the pixel identifier may include an edge identifier and a non-edge identifier.

In the process of determining the brightness parameter, the terminal may acquire the parameter values of the reference pixels adjacent to the non-reference pixel and perform calculation according to the maximum parameter value and the minimum parameter value among the parameter values of the adjacent reference pixels so that whether the non-reference pixel is an edge pixel is determined.

That is, the terminal may acquire the parameter values of at least two adjacent reference pixels of each non-reference pixel so that whether the edge identifier of the pixel identifier needs to be added to the non-reference pixel is determined according to the parameter value of each adjacent reference pixel.

Optionally, the terminal may select the maximum parameter value and the minimum parameter value according to the parameter value of each adjacent reference pixel and determine whether the quotient between the difference between the maximum parameter value and the minimum parameter value and the minimum parameter value is greater than a segment parameter value to which the minimum parameter value belongs so that the determination result is obtained, and finally, based on the determination result, the edge identifier is added to the non-reference pixel.

The terminal may divide the maximum range into multiple parameter value intervals according to the maximum range of the parameter values of adjacent reference pixels and assign different segment parameter values to the parameter value intervals according to the size of the parameter value in each parameter value interval.

For example, if the maximum range of the parameter value of adjacent reference pixel is [0, 255], the maximum range may be divided into eight parameter value intervals on average, [0, 31] serves as the first parameter value interval, and the segment parameter value of the first parameter value interval is set to 1; [248, 255] serves as the eighth parameter value interval, and the segment parameter value of the eighth parameter value interval is set to 8.

It is to be noted that, in the process of dividing the maximum range of the parameter value of adjacent reference pixel, the terminal may not only adopt an even division manner but also customize the division interval, which is not limited in embodiments of the present disclosure.

Therefore, after the terminal makes the determination, whether the non-reference pixel is an edge pixel is determined according to the determination result so that different pixel identifiers are added to different pixels. If the determination result indicates that the quotient is greater than the segment parameter value to which the minimum parameter value belongs, the terminal may add an edge identifier to the non-reference pixel. However, if the determination result indicates that the quotient is not greater than the segment parameter value to which the minimum parameter value belongs, the terminal may add a non-edge identifier to the non-reference pixel.

For example, the edge identifier may be the number of 1, and the non-edge identifier may be the number of 0. Of course, other manners may also be used, which is not limited in embodiments of the present disclosure.

In step 204, an adjustment area corresponding to an edge pixel is determined.

The adjustment area includes multiple pixels.

After the terminal identifies each non-reference pixel in the image, the edge pixels included in the image are determined by identifying the pixel identifier corresponding to the each non-reference pixel, and the adjustment area corresponding to each edge pixel is selected according to the position of each edge pixel in the image.

Optionally, the terminal may select the edge pixel from the pixels in the image according to the pixel identifier of each pixel in the image and select the adjustment area according to the position of each edge pixel in the image. Specifically, the terminal may acquire the pixel identifier of each pixel and determine whether the pixel identifier of each pixel is an edge identifier. If the pixel identifier of a certain pixel is an edge identifier, the certain pixel may be determined as an edge pixel.

In this embodiment, since a pixel identifier is added to the non-reference pixel, during the specific implementation, the terminal may select the edge pixel from non-reference pixels according to the pixel identifier of each non-reference pixel in the image.

Since the process of determining the adjustment area corresponding to the edge pixel in this step 204 is similar to the process of determining the adjustment area corresponding to the edge pixel in step 101, it will not be repeated herein.

In step 205, color information of the edge pixel and color information of each similar pixel in the adjustment area are acquired.

A pixel type of the similar pixel is consistent with a pixel type of the edge pixel.

After the adjustment area corresponding to the edge pixel is determined, the terminal may select the similar pixel whose pixel type is consistent with the pixel type of the edge pixel according to the pixel type of each pixel in the adjustment area and calculate the color information of the similar pixel according to the parameter value of the similar pixel and the pre-calculated saturation parameter value.

Optionally, the terminal may select multiple similar pixels according to the pixel type of each pixel in the adjustment area and determine whether the parameter value of each similar pixel is greater than the saturation parameter value. If the parameter value of the similar pixel is greater than the saturation parameter value, the color information of the similar pixel may be acquired according to the preset color ratio relationship.

In an embodiment, after the pixel type of each pixel is determined, the terminal may determine the similar pixel whose the pixel type matches the pixel type of the edge pixel according to the pixel type of each pixel, and determine whether the parameter value of the similar pixel is greater than the pre-calculated saturation parameter value according to the parameter value of each similar pixel so that different color information of similar pixels may be determined according to different determination results.

If the parameter value of the similar pixel is greater than the saturation parameter value, the white balance parameter corresponding to the color to which the similar pixel in the image belongs may be compared with the white balance parameter corresponding to the color to which the reference pixel in the image belongs, and the ratio of the white balance parameter corresponding to the color to which the similar pixel in the image belongs to the white balance parameter corresponding to the color to which the reference pixel in the image belongs may serve as the color information of the similar pixel. For example, if the similar pixel is a pixel that displays the blue color, the quotient between the white balance parameter corresponding to blue color in the image and the white balance parameter corresponding to the green color to which the reference pixel belongs may be solved, and this quotient may serve as the color information of the similar pixel.

However, if the parameter value of the similar pixel is not greater than the saturation parameter value, calculation is performed according to the parameter value of the similar pixel, the brightness parameter of the similar pixel, and the black level parameter of an image to which the similar pixel belongs so that the color information of the similar pixel is obtained.

For example, calculation may be performed according to a preset formula of the color information so that the color information of a similar pixel is obtained. The formula of the color information may be:

$$B = \frac{G_x - W}{B_x - W},$$

where B is the calculated color information, $G_x$ is the parameter value of a green parameter of the x-th similar pixel, that is, the brightness parameter of the x-th similar pixel, $B_x$ is the parameter value of the x-th similar pixel, the parameter value of the x-th similar pixel is the parameter value of a red parameter or a blue parameter, and W is the pre-acquired black level parameter.

Similarly, the color information of the edge pixel may also be acquired through the preceding manner through which the color information of the similar pixel is acquired.

For example, calculation may be performed according to a preset formula of the color information so that the color information of an edge pixel is obtained. The formula of the color information may be:

$$B' = \frac{G'_x - W'}{B'_x - W'},$$

where B' is the calculated color information, $G_x'$ is the parameter value of a green parameter of the x-th edge pixel, that is, the brightness parameter of the x-th similar pixel, $B_x'$ is the parameter value of the x-th edge pixel, the parameter value of the x-th edge pixel is the parameter value of a red parameter or a blue parameter of the x-th edge pixel, and W' is the pre-acquired black level parameter.

In step 206, the parameter value of the edge pixel is adjusted according to the color information of each similar pixel, the color information of the edge pixel, and the brightness parameter of the edge pixel.

This step 206 is similar to step 103 and will not be repeated herein.

In the color adjustment method provided in this embodiment, the adjustment area corresponding to the edge pixel is determined, the color information of each similar pixel in the adjustment area and the color information of the edge pixel are acquired, and the parameter value of the edge pixel is adjusted according to the color information of each similar pixel, the color information of the edge pixel, and the brightness parameter of the edge pixel. The parameter value of the edge pixel is adjusted so that the adjusted parameter value is approximate to the true parameter value corresponding to the edge pixel, the occurrence of false color pixels in an RGB image after the Bayer image is converted to the RGB image is avoided, and the accuracy of the case where the Bayer image is converted to the RGB image is improved.

Figure 3:
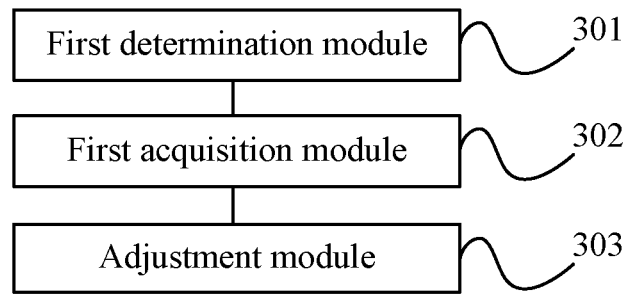
FIG. 3 is a schematic diagram of a color adjustment device according to an embodiment of the present disclosure.

FIG. 3 is a schematic diagram of a color adjustment device according to an embodiment of the present disclosure. As shown in FIG. 3, the device includes a first determination module 301, a first acquisition module 302, and an adjustment module 303.

The first determination module 301 is configured to determine an adjustment area corresponding to an edge pixel, where the adjustment area includes multiple pixels.

The first acquisition module 302 is configured to acquire color information of each similar pixel in the adjustment area and color information of the edge pixel, where a pixel type of the similar pixel is consistent with a pixel type of the edge pixel.

The adjustment module 303 is configured to adjust a parameter value of the edge pixel according to the color information of the similar pixel, the color information of the edge pixel, and a brightness parameter of the edge pixel.

Optionally, the first acquisition module 302 is configured to select multiple similar pixels according to the pixel type of each pixel in the adjustment area; to determine whether a parameter value of each similar pixel is greater than a saturation parameter value; if the parameter value of the similar pixel is greater than the saturation parameter value, to acquire the color information of the similar pixel according to a preset color ratio relationship; and if the parameter value of the similar pixel is not greater than the saturation parameter value, to perform calculation according to the parameter value of the similar pixel, the brightness parameter of the similar pixel, and a black level parameter of an image to which the similar pixel belongs to acquire the color information of the similar pixel.

Figure 4:
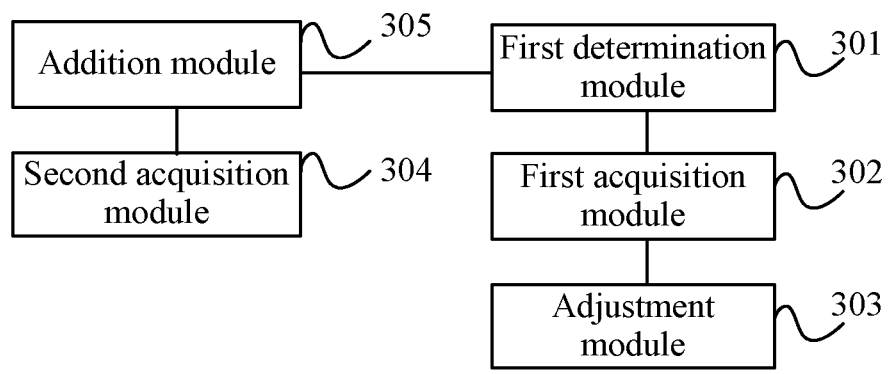
FIG. 4 is a schematic diagram of a color adjustment device according to another embodiment of the present disclosure.

Optionally, referring to FIG. 4, the device further includes a second acquisition module 304 and an addition module 305.

The second acquisition module 304 is configured to acquire a parameter value of at least one adjacent reference pixel for a non-reference pixel, where each adjacent reference pixel is adjacent to the non-reference pixel.

The addition module 305 is configured to add a pixel identifier to the non-reference pixel according to the parameter value of each adjacent reference pixel, where the pixel identifier is configured to indicate whether the non-reference pixel is the edge pixel.

Optionally, the addition module 305 is configured to select a maximum parameter value and a minimum parameter value according to the parameter value of each adjacent reference pixel; to determine whether a quotient between a difference between the maximum parameter value and the minimum parameter value and the minimum parameter value is greater than a segment parameter value to which the minimum parameter value belongs to obtain a determination result; and to add the pixel identifier to the non-reference pixel based on the determination result.

Optionally, the pixel identifier includes an edge identifier and a non-edge identifier.

The addition module 305 is configured to add the edge identifier to the non-reference pixel if the determination result indicates that the quotient is greater than the segment parameter value to which the minimum parameter value belongs; and add the non-edge identifier to the non-reference pixel if the determination result indicates that the quotient is not greater than the segment parameter value to which the minimum parameter value belongs.

Optionally, the first determination module 301 is configured to select the edge pixel from the pixels in the image according to the pixel identifier of each pixel in the image; and select the adjustment area according to a position of each edge pixel in the image.

Figure 5:
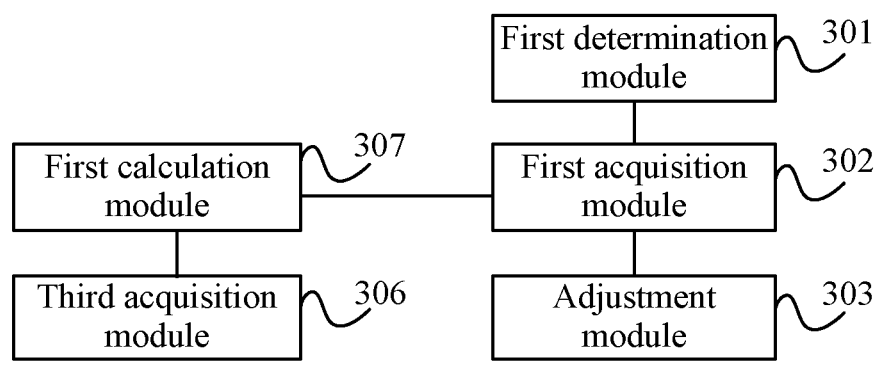
FIG. 5 is a schematic diagram of a color adjustment device according to another embodiment of the present disclosure.

Optionally, referring to FIG. 5, the device further includes a third acquisition module 306 and a first calculation module 307.

The third acquisition module 306 is configured to acquire a white balance parameter of the image.

The first calculation module 307 is configured to perform calculation according to the white balance parameter and the black level parameter of the image to obtain the saturation parameter value.

Figure 6:
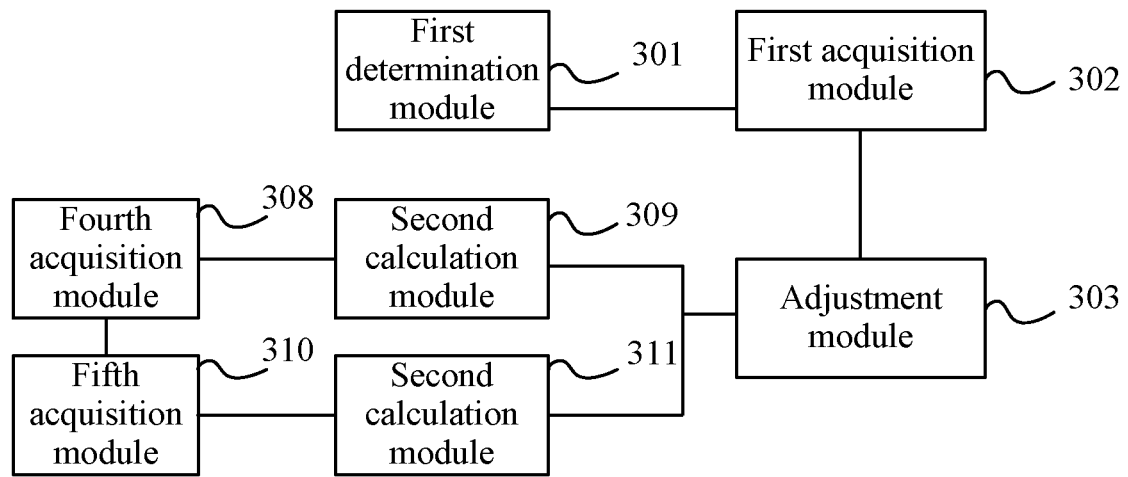
FIG. 6 is a schematic diagram of a color adjustment device according to another embodiment of the present disclosure.

Optionally, referring to FIG. 6, the device further includes a fourth acquisition module 308, a second determination module 309, a fifth acquisition module 310, and a second calculation module 311.

The fourth acquisition module 308 is configured to acquire a pixel type of the pixel.

The second determination module 309 is configured to use a parameter value of the reference pixel as a brightness parameter if the pixel is the reference pixel.

The fifth acquisition module 310 is configured to acquire a parameter value of at least one adjacent reference pixel if the pixel is the non-reference pixel, where each adjacent reference pixel is adjacent to the non-reference pixel.

The second calculation module 311 is configured to perform calculation to obtain a brightness parameter of the non-reference pixel according to a parameter value of each reference pixel.

To sum up, in the color adjustment device provided in embodiments of the present disclosure, the adjustment area corresponding to the edge pixel is determined, the color information of each similar pixel in the adjustment area and the color information of the edge pixel are acquired, and the parameter value of the edge pixel is adjusted according to the color information of each similar pixel, the color information of the edge pixel, and the brightness parameter of the edge pixel. The parameter value of the edge pixel is adjusted so that the adjusted parameter value is relatively approximate to the true parameter value corresponding to the edge pixel, the occurrence of false color pixels in an RGB image after the Bayer image is converted to the RGB image is avoided, and the accuracy of the case where the Bayer image is converted to the RGB image is improved.

The preceding device is configured to perform the method provided in the preceding embodiments, and the implementation principles and technical effects are similar, which will not be repeated herein.

The preceding modules may be one or more integrated circuits configured to perform the preceding methods, for example, one or more application specific integrated circuits (ASIC), or one or more digital signal processors (DSP), or one or more field programmable gate arrays (FPGA). For another example, when one of the preceding modules is implemented in the form of processing element calling program codes, the processing element may be a general-purpose processor such as a central processing unit (CPU) or other processors that can call the program codes. For another example, these modules may be integrated together and implemented in the form of a system-on-a-chip (SOC).

Figure 7:
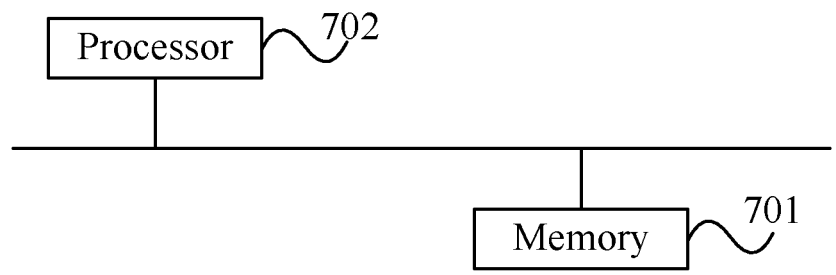
FIG. 7 is a schematic diagram of a color adjustment device according to an embodiment of the present disclosure.

FIG. 7 is a schematic diagram of a color adjustment device according to an embodiment of the present disclosure. The device may be integrated in a terminal device or a chip of a terminal device. The terminal may be a computing device with a color adjustment function.

The device includes a memory 701 and a processor 702.

The memory 701 is configured to store programs, and the processor 702 calls the programs stored in the memory 701 to execute the preceding method embodiments. The specific implementation manners and technical effects are similar, which will not be repeated herein.

Optionally, the present disclosure further provides a program product such as a computer-readable storage medium including a program, which is configured to execute the preceding method embodiments when executed by a processor.

It is to be understood that the devices and the methods disclosed in embodiments of the present disclosure may be implemented in other manners. For example, the apparatus embodiments described above are merely illustrative. For example, a unit division is merely a logical function division, and, in practice, the unit division may be implemented in other ways. For example, multiple units or components may be combined or integrated into another system, or some features may be ignored or not executed. Additionally, the presented or discussed mutual coupling, direct coupling or communication connections may be indirect coupling or in communication connection via interfaces, apparatuses, or units, or may be electrical, mechanical, or in other forms.

The units described as separate components may or may not be physically separated. Components presented as units may or may not be physical units, that is, may be located in one place or may be distributed on multiple network units. Part or all of these units may be selected according to practical requirements to achieve the objects of the solutions in the embodiments.

Additionally, each functional unit in each embodiment of the present disclosure may be integrated into one processing unit, or each unit may be physically present, or two or more units may be integrated into one unit. The integrated unit may be implemented by hardware or may be implemented by hardware plus a software function unit.

The preceding integrated unit implemented in the form of a software functional unit may be stored in a computer-readable storage medium. The software functional unit is stored in a storage medium, which includes a number of instructions for enabling a computer device (which may be a personal computer, a server, or a network device, etc.) or a processor to perform part of steps of the method described in each embodiment of the present disclosure. The storage medium includes a USB flash disk, a mobile hard disk, a read-only memory (ROM), a random-access memory (RAM), a magnetic disk, an optical disk or another medium capable of storing program codes.

Figure 8:
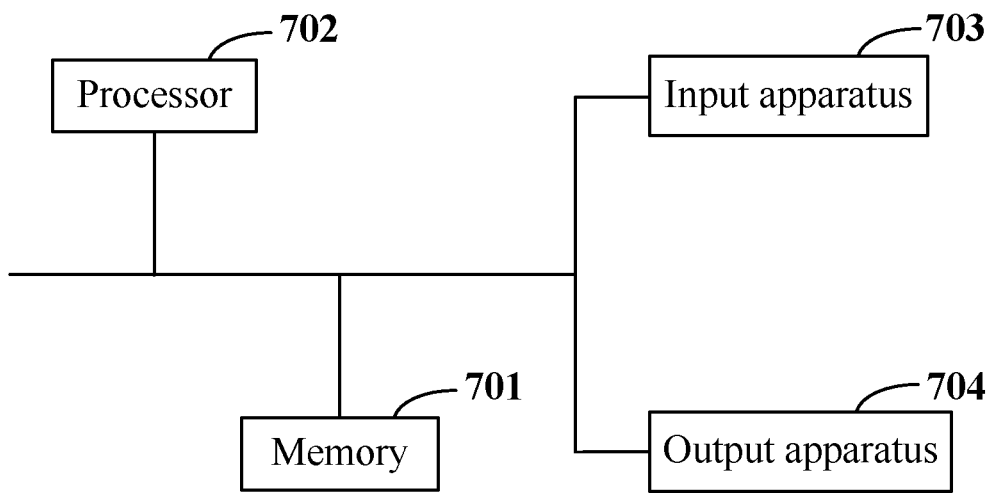
FIG. 8 is a structure diagram of an electronic device according to an embodiment of the present disclosure.

The present disclosure further proposes an electronic device. FIG. 8 is a structural schematic diagram of the hardware of an electronic device according to an embodiment. As shown in FIG. 8, the electronic device includes one or more processors 702 and a memory 701. One processor 702 is used as an example in FIG. 8.

The electronic device may further include an input apparatus 703 and an output apparatus 704.

The processor 702, the memory 701, the input apparatus 703, and the output apparatus 440 in the electronic device may be connected via a bus or in other manners, with connection via a bus as an example in FIG. 8.

As a computer-readable storage medium, the memory 701 may be configured to store software programs, computer-executable programs, and modules. The processor 702 runs the software programs, instructions, and modules stored in the memory 701 to perform function applications and data processing, that is, to implement any method in the preceding embodiments.

The memory 701 may include a program storage region and a data storage region, where the program storage region may store an operating system and an application program required by at least one function while the data storage region may store data created according to use of an electronic device. In addition, the memory may include a volatile memory such as a random-access memory (RAM) and may also include a nonvolatile memory such as at least one click memory, a flash memory, or other non-transient solid-state memories.

The memory 701 may be a non-transient computer storage medium or a transient computer storage medium. The non-transient computer storage medium includes, for example, at least one disk memory, a flash memory, or another nonvolatile solid-state memory. In some embodiments, the memory 701 optionally includes memories which are remotely disposed relative to the processor 702 and these remote memories may be connected to the electronic device via a network. Examples of such a network may include the Internet, intranets, local area networks, mobile communication networks, and combinations thereof.

The input apparatus 703 may be configured to receive inputted digital or character information and generate key signal input related to user settings and function control of the electronic device. The output apparatus 704 may include display devices such as a display screen.

All or part of the procedure processes in the methods of the preceding embodiments may be implemented by related hardware executed by computer programs, these programs may be stored in a non-transient computer-readable storage medium, and during the execution of these programs, the processes in the preceding method embodiments may be implemented. The non-transient computer-readable storage medium may be a magnetic disk, an optical disk, a read-only memory (ROM), or an RAM.

What is claimed is:

1. A color adjustment method, comprising:
   determining an adjustment area corresponding to an edge pixel, wherein the adjustment area comprises a plurality of similar pixels;
   acquiring color information of the edge pixel and acquiring color information of each of the plurality of similar pixels in the adjustment area, wherein each of the plurality of similar pixels and the edge pixel have a same pixel display color; and
   adjusting a parameter value of the edge pixel according to the color information of each of the plurality of similar pixels, the color information of the edge pixel, and a brightness parameter of the edge pixel;
   wherein acquiring the color information of each of the plurality of similar pixels in the adjustment area comprises:
   selecting the plurality of similar pixels based on the plurality of similar pixels having the same pixel display color as the edge pixel;

determining whether a parameter value of each of the plurality of similar pixels is greater than a saturation parameter value; and for each of the plurality of similar pixels in which it is determined that the parameter value of the similar pixel is not greater than the saturation parameter value, performing a calculation according to the parameter value of the similar pixel, a brightness parameter of the similar pixel, and a black level parameter of an image to which the similar pixel belongs, to obtain the color information of the similar pixel.

2. The method of claim 1, wherein the color information of each of the plurality of similar pixels is obtained according to a preset color ratio relationship.

3. The method of claim 1, wherein before determining the adjustment area corresponding to the edge pixel, the method further comprises:

acquiring a parameter value of at least one adjacent reference pixel for a non-reference pixel, wherein each of the at least one adjacent reference pixel is adjacent to the non-reference pixel; and adding a pixel identifier to the non-reference pixel according to a parameter value of each of the at least one adjacent reference pixel, wherein the pixel identifier is configured to indicate whether the non-reference pixel is the edge pixel.

4. The method of claim 3, wherein adding the pixel identifier to the non-reference pixel according to the parameter value of each of the at least one adjacent reference pixel comprises:

selecting a maximum parameter value and a minimum parameter value according to the parameter value of each of the at least one adjacent reference pixel;

determining whether a quotient between a difference between the maximum parameter value and the minimum parameter value and the minimum parameter value is greater than a segment parameter value to which the minimum parameter value belongs, to obtain a determination result; and adding the pixel identifier to the non-reference pixel according to the determination result.

5. The method of claim 4, wherein the pixel identifier comprises an edge identifier and a non-edge identifier;

wherein adding the pixel identifier to the non-reference pixel according to the determination result comprises:

adding the edge identifier to the non-reference pixel based on a determination that the quotient is greater than the segment parameter value to which the minimum parameter value belongs; and adding the non-edge identifier to the non-reference pixel based on a determination that the quotient is not greater than the segment parameter value to which the minimum parameter value belongs.

6. The method of claim 3, wherein determining the adjustment area corresponding to the edge pixel comprises:

selecting the edge pixel from pixels in the image according to pixel identifiers of the pixels in the image; and selecting the adjustment area according to a position of the edge pixel in the image.

7. The method of claim 1, wherein before determining the adjustment area corresponding to the edge pixel, the method further comprises:

acquiring a white balance parameter of the image; and performing a calculation according to the white balance parameter and the black level parameter of the image to obtain a saturation parameter value.

8. The method of claim 1, wherein before determining the adjustment area corresponding to the edge pixel, the method further comprises:

acquiring a pixel display color of each pixel in an image;

acquiring a parameter value of at least one adjacent reference pixel, wherein each of the at least one adjacent reference pixel is adjacent to a non-reference pixel; and calculating a brightness parameter of the non-reference pixel according to the parameter value of each the at least one adjacent reference pixel.

9. The method of claim 1, wherein before determining the adjustment area corresponding to the edge pixel, the method further comprises:

using a parameter value of a reference pixel as a brightness parameter of the reference pixel.

10. An electronic device, comprising:

at least one processor; and a memory, which is configured to store at least one program, wherein when executed by the at least one processor, the at least one program enables the at least one processor to perform the following:

determining an adjustment area corresponding to an edge pixel, wherein the adjustment area comprises a plurality of similar pixels;

acquiring color information of the edge pixel and acquiring color information of each of the plurality of similar pixels in the adjustment area, wherein each of the plurality of similar pixels and the edge pixel have a same pixel display color; and adjusting a parameter value of the edge pixel according to the color information of each of the plurality of similar pixels, the color information of the edge pixel, and a brightness parameter of the edge pixel;

wherein acquiring the color information of each of the plurality of similar pixels in the adjustment area comprises:

selecting the plurality of similar pixels based on the plurality of similar pixels having the same pixel display color as the edge pixel;

determining whether a parameter value of each of the plurality of similar pixels is greater than a saturation parameter value; and for each of the plurality of similar pixels in which it is determined that the parameter value of the similar pixel is not greater than the saturation parameter value, performing a calculation according to the parameter value of the similar pixel, a brightness parameter of the similar pixel, and a black level parameter of an image to which the similar pixel belongs, to obtain the color information of the similar pixel.

11. A non-transitory computer-readable storage medium, which is configured to store computer instructions that, when executed by a processor, perform the following:

determining an adjustment area corresponding to an edge pixel, wherein the adjustment area comprises a plurality of similar pixels;

acquiring color information of the edge pixel and acquiring color information of each of the plurality of similar pixels in the adjustment area, wherein each of the plurality of similar pixels and the edge pixel have a same pixel display color; and adjusting a parameter value of the edge pixel according to the color information of each of the plurality of similar pixels, the color information of the edge pixel, and a brightness parameter of the edge pixel;

wherein acquiring the color information of each of the plurality of similar pixels in the adjustment area comprises:
selecting the plurality of similar pixels based on the plurality of similar pixels having the same pixel display color as the edge pixel;
determining whether a parameter value of each of the plurality of similar pixels is greater than a saturation parameter value; and
for each of the plurality of similar pixels in which it is determined that the parameter value of the similar pixel is not greater than the saturation parameter value, performing a calculation according to the parameter value of the similar pixel, a brightness parameter of the similar pixel, and a black level parameter of an image to which the similar pixel belongs, to obtain the color information of the similar pixel.

12. The storage medium of claim 11, wherein the color information of each of the plurality of similar pixels is obtained according to a preset color ratio relationship.

13. The electronic device of claim 10, wherein the color information of each of the plurality of similar pixels is obtained according to a preset color ratio relationship.

14. The electronic device of claim 10, wherein before determining the adjustment area corresponding to the edge pixel, the at least one program enables the at least one processor to further perform:
acquiring a parameter value of at least one adjacent reference pixel for a non-reference pixel, wherein each of the at least one adjacent reference pixel is adjacent to the non-reference pixel; and
adding a pixel identifier to the non-reference pixel according to a parameter value of each of the at least one adjacent reference pixel, wherein the pixel identifier is configured to indicate whether the non-reference pixel is the edge pixel.

15. The electronic device of claim 14, wherein the at least one program enables the at least one processor to perform adding the pixel identifier to the non-reference pixel according to the parameter value of each of the at least one adjacent reference pixel by:
selecting a maximum parameter value and a minimum parameter value according to the parameter value of each of the at least one adjacent reference pixel;
determining whether a quotient between a difference between the maximum parameter value and the minimum parameter value and the minimum parameter value is greater than a segment parameter value to which the minimum parameter value belongs, to obtain a determination result; and
adding the pixel identifier to the non-reference pixel according to the determination result.

16. The electronic device of claim 15, wherein the pixel identifier comprises an edge identifier and a non-edge identifier;
wherein the at least one program enables the at least one processor to perform adding the pixel identifier to the non-reference pixel according to the determination result by:
adding the edge identifier to the non-reference pixel based on a determination that the quotient is greater than the segment parameter value to which the minimum parameter value belongs; and
adding the non-edge identifier to the non-reference pixel based on a determination that the quotient is not greater than the segment parameter value to which the minimum parameter value belongs.

17. The electronic device of claim 14, wherein the at least one program enables the at least one processor to perform determining the adjustment area corresponding to the edge pixel by:
selecting the edge pixel from pixels in the image according to pixel identifiers of the pixels in the image; and
selecting the adjustment area according to a position of the edge pixel in the image.

18. The electronic device of claim 10, wherein before determining the adjustment area corresponding to the edge pixel, the at least one program enables the at least one processor to further perform:
acquiring a white balance parameter of the image; and
performing calculation according to the white balance parameter and the black level parameter of the image to obtain a saturation parameter value.

19. The electronic device of claim 10, wherein before determining the adjustment area corresponding to the edge pixel, the at least one program enables the at least one processor to further perform:
acquiring a pixel display color of each pixel in an image;
acquiring a parameter value of at least one adjacent reference pixel, wherein each of the at least one adjacent reference pixel is adjacent to a non-reference pixel; and
calculating a brightness parameter of the non-reference pixel according to the parameter value of each of the at least one adjacent reference pixel.

20. The electronic device of claim 10, wherein before determining the adjustment area corresponding to the edge pixel, the at least one program enables the at least one processor to further perform:
using a parameter value of a reference pixel as a brightness parameter of the reference pixel.

* * * * *